(12) United States Patent
Stengl et al.

(10) Patent No.: US 8,901,437 B2
(45) Date of Patent: Dec. 2, 2014

(54) CABLE RACEWAY

(75) Inventors: Robert M. Stengl, Locust Grove, GA (US); Chad P. Snoeberger, McDonough, GA (US)

(73) Assignee: Caterpillar Inc., Peoria, IL (US)

( * ) Notice: Subject to any disclaimer, the term of this patent is extended or adjusted under 35 U.S.C. 154(b) by 179 days.

(21) Appl. No.: 13/562,431

(22) Filed: Jul. 31, 2012

(65) Prior Publication Data

US 2014/0034379 A1 Feb. 6, 2014

(51) Int. Cl.
*H02G 3/04* (2006.01)
*H05K 9/00* (2006.01)

(52) U.S. Cl.
USPC ............ 174/495; 174/101; 174/35.2; 138/92; 138/97

(58) Field of Classification Search
CPC ............ H02G 3/04; H02G 3/06; H02G 3/08; H02G 3/12; H02G 15/10; H02B 1/26
USPC .................... 174/495, 101, 35; 138/92, 97
See application file for complete search history.

(56) References Cited

U.S. PATENT DOCUMENTS

| | | | | |
|---|---|---|---|---|
| 3,562,402 A * | 2/1971 | Dwyer | ............. | 174/373 |
| 3,570,546 A * | 3/1971 | Jackson | ............. | 138/155 |
| 5,792,993 A * | 8/1998 | Rinderer | ............. | 174/101 |
| 2010/0060015 A1* | 3/2010 | Buker | ............. | 290/1 R |

* cited by examiner

*Primary Examiner* — Timothy Thompson
*Assistant Examiner* — Michael F McAllister
(74) *Attorney, Agent, or Firm* — Miller, Matthias & Hull

(57) ABSTRACT

A cable raceway having a first section adapted to be coupled with a first movable component. The cable raceway also includes a second section adapted to be coupled with a second movable component. The second section is configured to enclose a portion of the first section. The cable raceway further includes a seal member placed between the first section and the second section. The seal member is configured to isolate the first section and the second section.

20 Claims, 4 Drawing Sheets

CABLE RACEWAY

TECHNICAL FIELD

The present disclosure relates to a cable raceway, and more particularly, to a cable raceway adapted to be mounted between movable components, such as a generator power connection box and a power center of a generator assembly.

BACKGROUND

A generator assembly includes a power center, which is a combination of a generator and a prime mover, such as, an internal combustion engine. As fuel is burned within the prime mover, a mechanical rotation is created that drives the generator to produce electrical power. The generator assembly also includes a generator power connection box used for monitoring and controlling the operation of the power center such that electrical power is produced in a desired manner. The generator power connection box is operatively connected with the power center by electrical cables. Generally, these electrical cables are accommodated by a simple raceway with a wiper seal.

SUMMARY OF THE DISCLOSURE

In one aspect, the present disclosure provides a cable raceway. The cable raceway includes a first section adapted to be coupled with a first movable component. The cable raceway also includes a second section adapted to be coupled with a second movable component. The second section is configured to enclose a portion of the first section. The cable raceway further includes a seal member placed between the first section and the second section. The seal member is configured to isolate the first section and the second section.

In another aspect, the present disclosure provides a cable raceway between a generator power connection box and a power centre. The cable raceway includes a first section adapted to be coupled with the generator power connection box, and a second section adapted to be coupled with the power centre. The second section is configured to enclose a portion of the first section. The cable raceway also includes a seal member placed between the first section and the second section. The seal member is configured to isolate the first section and the second section.

In yet another aspect, the present disclosure provides a generator assembly. The generator assembly includes a power centre and a generator power connection box operatively coupled to the power centre by cables. The generator assembly also includes a cable raceway between the power centre and the generator power connection box for allowing the cables to pass there-through. The cable raceway includes a first section adapted to be coupled with the generator power connection box, and a second section adapted to be coupled with the power centre. The second section is configured to enclose a portion of the first section. The cable raceway also includes a seal member placed between the first section and the second section. The seal member is configured to isolate the first section and the second section.

Other features and aspects of this disclosure will be apparent from the following description and the accompanying drawings.

DETAILED DESCRIPTION

Figure 1:
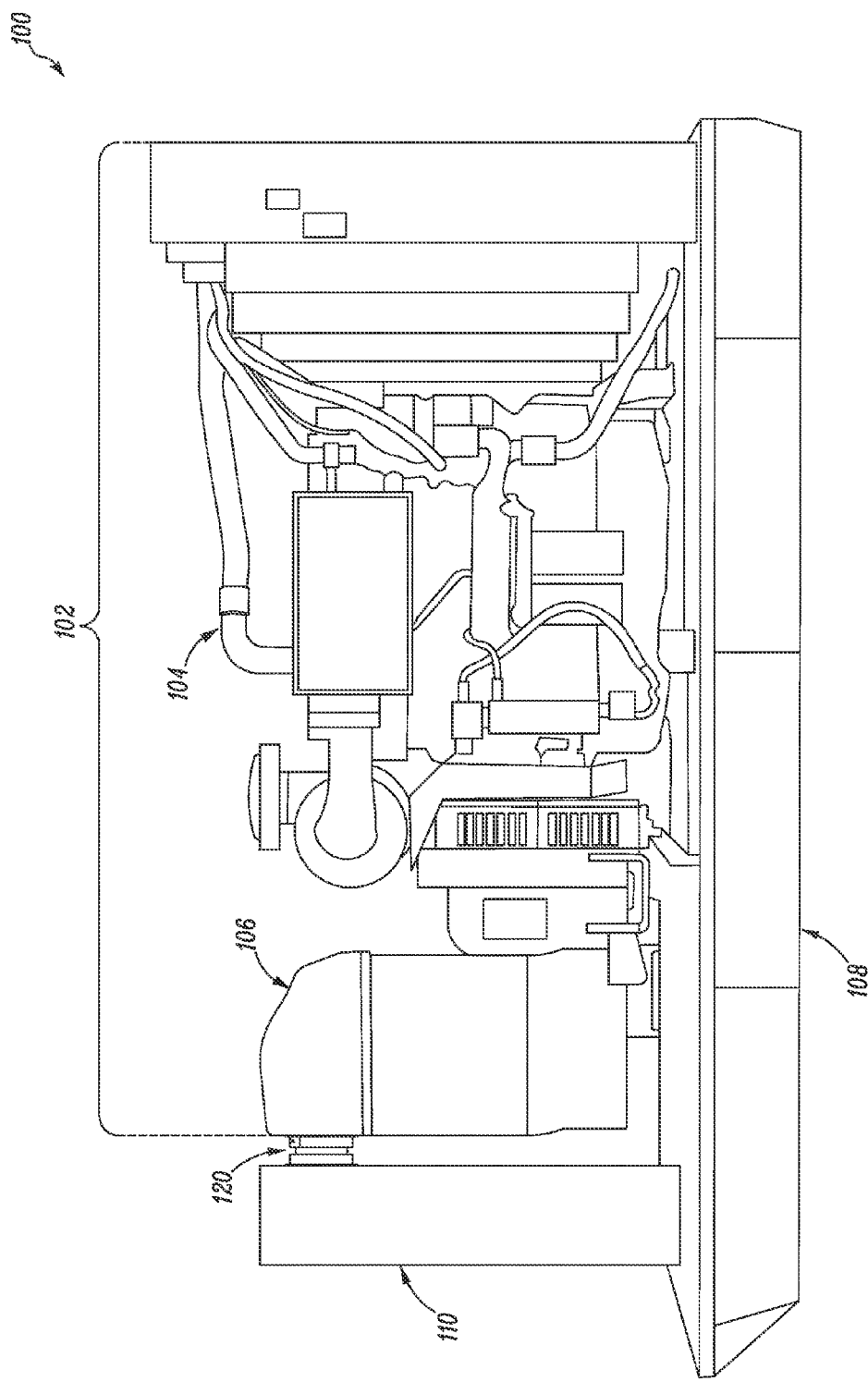
FIG. 1 illustrates a front view of a generator assembly.

The present disclosure will now be described in detail with reference being made to accompanying figures. An exemplary electrical machine in which disclosed embodiment may be implemented is schematically illustrated in FIG. 1. In the accompanied drawings, the electrical machine is illustrated as a generator assembly 100.

The generator assembly 100 includes a power center 102. The power center 102 includes a prime mover 104 and a generator 106 operatively coupled to the prime mover 104. For the purposes of this disclosure, the prime mover 104 may be described as a heat engine, for example, a combustion engine that combusts a mixture of fuel and air to produce mechanical rotations. Further, the prime mover 104 may be any type of combustion engine such as, for example, a diesel engine, a gasoline engine, or a gaseous fuel-powered engine.

The generator 106 may be, for example, an AC induction generator, a permanent-magnet generator, an AC synchronous generator, or a switched-reluctance generator. The generator 106 may receive the mechanical rotation produced by the prime mover 104 to produce electrical power. The electrical power produced by the generator 106 may be directed for offboard purposes by way of one or more generator bus bars. The prime mover 104 and the generator 106 may be rigidly mounted on a platform 108.

The generator assembly 100 also includes a generator power connection box 110 mounted on the platform 108 and in communication (electrically coupled) with the prime mover 104 and/or the generator 106. The generator power connection box 110 may facilitate in monitoring and controlling the electrical power produced by the power center 102. For example, the generator power connection box 110 may include a voltage regulator, a fuel governor, a load sharing control and the like, for monitoring and controlling the operation of the power center 102.

Figure 2:
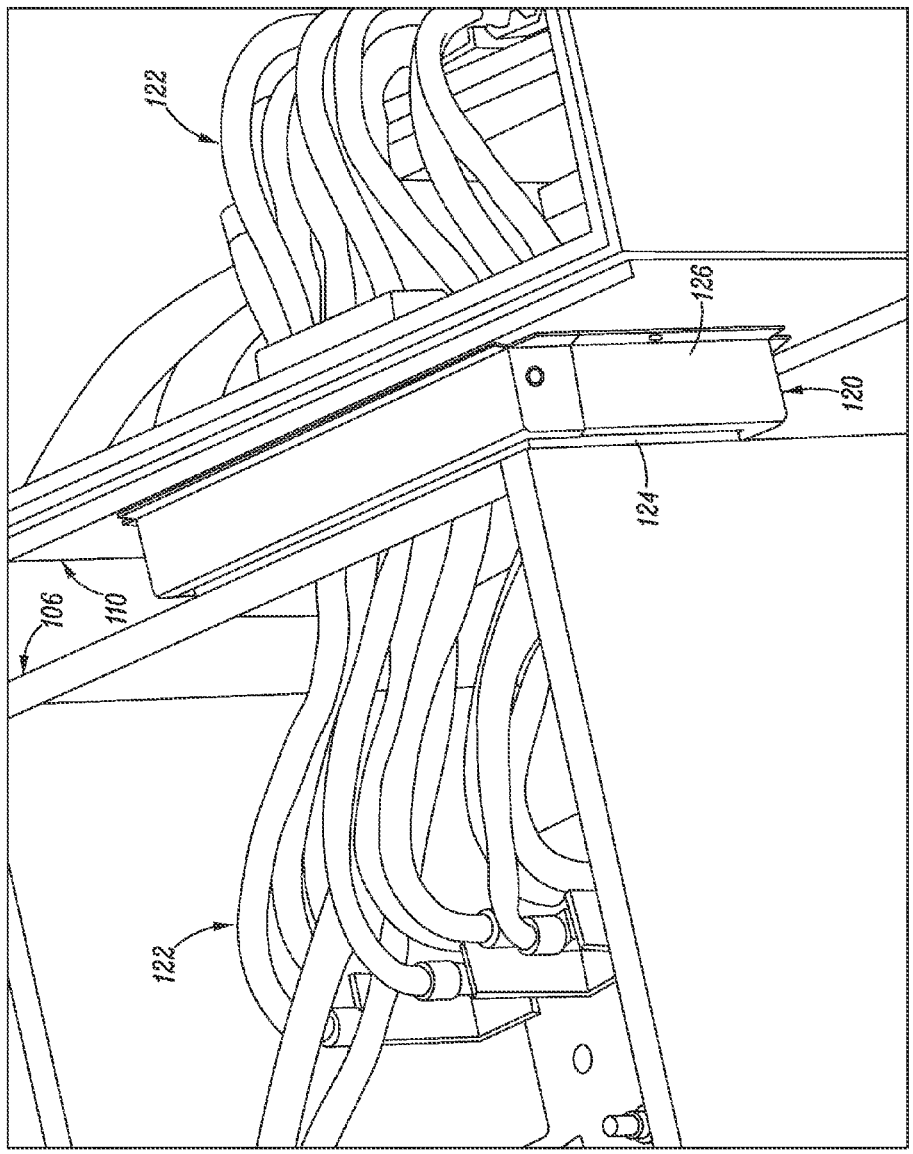
FIG. 2 illustrates a perspective view a cable raceway positioned between a generator power connection box and a power centre of the generator assembly.

The generator assembly 100 also includes a cable raceway 120 positioned between the generator power connection box 110 and the power center 102. As shown in FIG. 2, the cable raceway 120 is positioned between and coupled to the generator power connection box 110 and the generator 106. The cable raceway 120 accommodates and allows cables 122, which electrically couple the generator power connection box 110 with the generator 106, to pass there-through. The cable raceway 120 includes a first section 124 and a second section 126.

Figure 3:
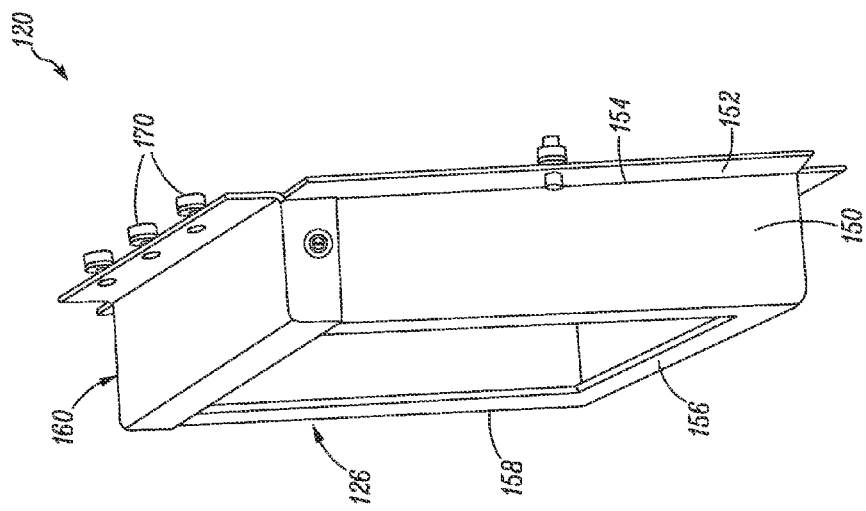
FIG. 3 illustrates a perspective view of the cable raceway in an unassembled state.
Figure 3:
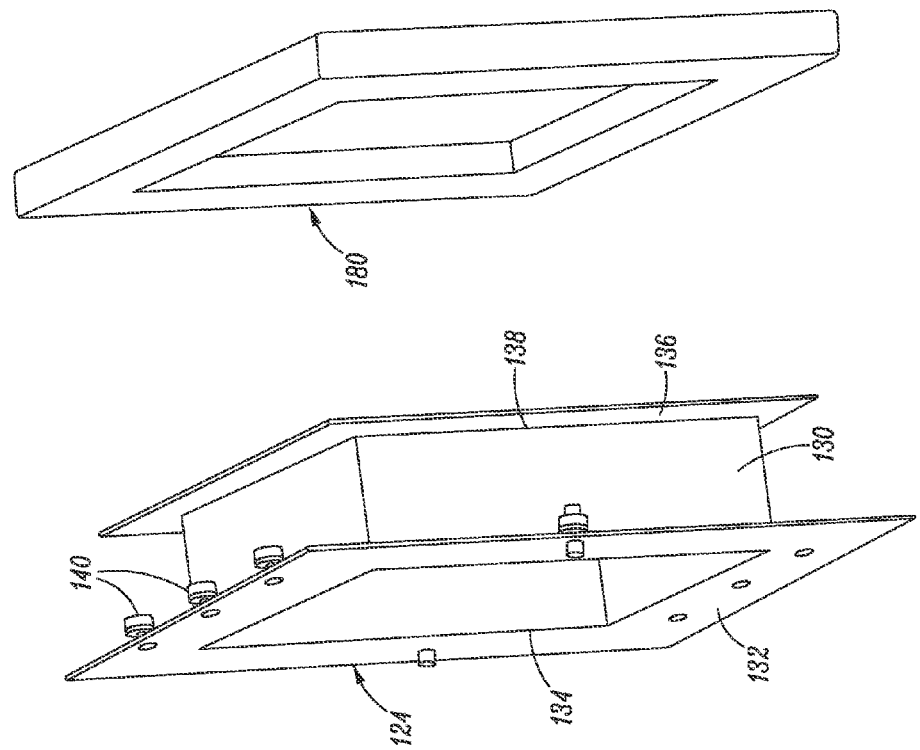

Referring now to FIG. 3, an unassembled perspective view of the cable raceway 120 is shown. The first section 124 includes a first hollow body 130. For the purposes of this disclosure, the first hollow body 130 may be configured to have a rectangular elongated structure. The rectangular elongated structure may be refers to an elongated hollow structure with a rectangular cross-section. Further, the first hollow body 130 may be configured to have one of a circular, an oval or other polygonal elongated structure.

The first section 124 may also include a first flange 132 extending outwardly from a first end 134 of the first hollow body 130. For example, the first flange 132 may extend perpendicularly outward from the first end 134 of the first hollow body 130. The first section 124 further includes a second flange 136 extending outwardly from a second end 138 of the first hollow body 130. The second flange 136 may also extend perpendicularly outward from the second end 138 of the first hollow body 130. The first flange 132 and the second flange 136 are parallely spaced apart; and the first flange 132 may be comparatively larger in sized as compared to the second flange 136.

The first section 124 is adapted to be coupled to the generator power connection box 110, as shown in FIG. 2. For example, the first flange 132 of the first section 124 may be coupled with the generator power connection box 110 with the help of coupling means 140, such as bolts, screws or by means of welding. Further, the first section 124 is coupled about an opening configured on the generator power connection box 110, as shown in FIG. 2. For example, the first section 124 may be coupled to the generator power connection box 110 such that the first hollow body 130 conforms to the opening of the generator power connection box 110.

Referring again to FIG. 3, the second section 126 includes a second hollow body 150. In the present disclosure, the second hollow body 150 is configured to have a rectangular elongated structure. However, the second hollow body 150 may be configured to have one of a circular, an oval or other polygonal elongated structure.

The second section 126 also includes a first lip 152 extending outwardly from a first end 154 of the second hollow body 150. For example, the first lip 152 may extend perpendicularly outward from the first end 154 of the second hollow body 150. The second section 126 further includes a second lip 156 extending inwardly from a second end 158 of the second hollow body 150. The second lip 156 may extend perpendicularly inward from the second end 158 of the second hollow body 150. The first lip 152 and the second lip 156 are parallely spaced apart from each other.

Figure 4:
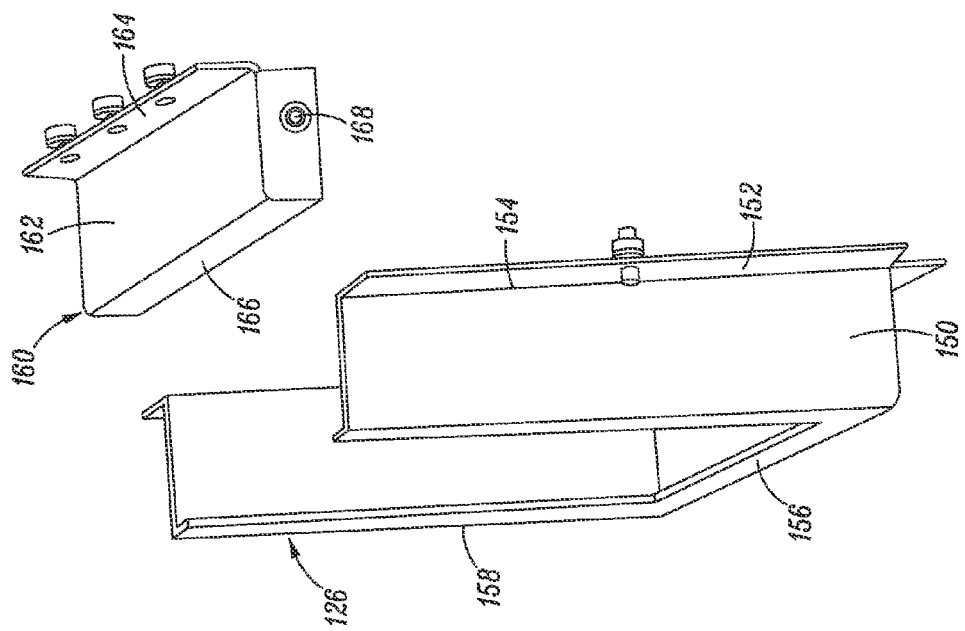
FIG. 4 illustrates a perspective view of a second section of the cable raceway.

The second section 126 also includes a cut-out member 160 adapted to be removed for allowing the second section 126 to receive the first section 124, which will be further explained herein. Referring now to FIG. 4, the cut-out member 160 is shown decoupled from the second section 126. The cut-out member 160 includes a body portion 162 conforming to the second hollow body 150 of the second section 126.

The cut-out member 160 also includes a first brim 164 in line with the first lip 152 of the second section 126. The cut-out member 160 further includes a second brim 166 in line with the second lip 156 of the second section 126. The cut-out member 160 is adapted to be removabley coupled with the second section 126. For example, the body portion 162 of the cut-out member 160 may be removabley coupled with the second hollow body 150 of the second section 126 with the help of fasteners 168, such as bolts or screws.

It is to be understood that, the cut-out member 160 is a removable part of the second section 126, however, the cut-out member 160 and the second section 126 referred may be referred to as a monolithic structure. For example, while defining a body of the second section 126 the body portion 162 of the cut-out member 160 may be referred to as an integral portion of the second hollow body 150 of the second section 126. Similarly, the first brim 164 and the second brim 166 may be referred to as an integral portion of the first lip 152 and the second lip 156, respectively.

The second section 126 is adapted to be coupled to the generator power connection box 110, as shown in FIG. 2. For example, the first lip 152 of the second section 126 may be coupled to the generator power connection box 110 with the help of coupling means 170 (shown in FIG. 3), such as bolts or screws. Further, the second section 126 may be coupled about an opening configured on the generator power connection box 110. The second section 126 may be coupled to the generator power connection box 110 such that the second hollow body 150 conforms to the opening of the generator power connection box 110.

The first section 124 and the second section 126 of the present disclosure are made of a metal or a metal alloy. For example, the first section 124 and the second section 126 may be made of steel. Additionally, the first section 124 and the second section 126 may be made of a metal such as iron or aluminum. In one example, the sections 124, 126 may be made of steel-carbon alloy or a polymer. However, it may be evident to those skilled in the art that the first section 124 and the second section 126 may be made of plastic material, such as thermoplastics and thermosetting polymers.

As shown in FIG. 3, the cable raceway 120 also includes a seal member 180 adapted to be placed between the first section 124 and the second section 126, which will be explained herein later. The seal member 180 is configured to isolate the first section 124 and the second section 126. The seal member 180 is configured to have a shape of a rectangular loop. This allows the seal member 180 to be conveniently received on the first hollow body 130 of the first section 124. However, it may be evident to those skilled in the art that the seal member 180 may be made of an elastic material and configured to have a shape of a circular loop for being received on the first hollow body 130 of the first section 124.

In the present disclosure, the seal member 180 may be made of an elastomeric material. For example, the seal member 180 may be made of polyether urethane foam with thermally applied urethane film. However, it may be evident to those skilled in the art that the seal member 180 may be made of other material depending on application need and could be substituted with closed cell foam, silicone, EPDM rubber and the like.

Figure 5:
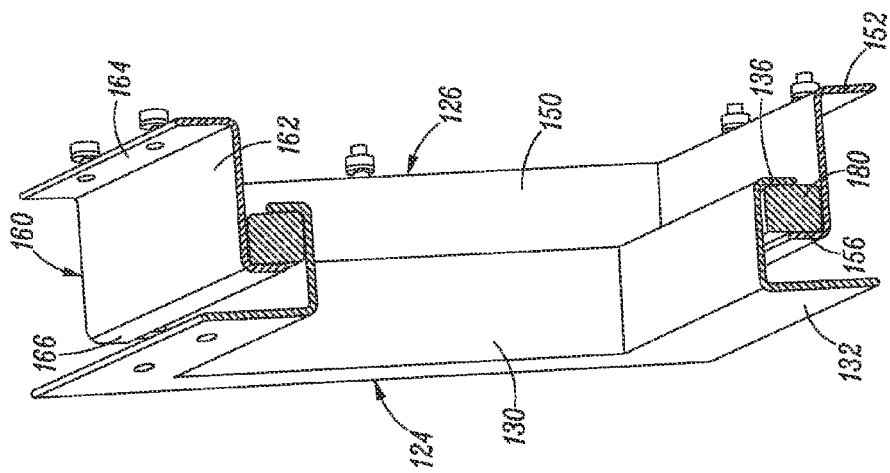
FIG. 5 illustrates a cross-sectional view of the cable raceway in an assembled state.

Referring now to FIG. 5, a cross-sectional view of the cable raceway 120 is shown in an assembled state. The cable raceway 120 may be assembled by placing the seal member 180 on the first hollow body 130 of the first section 124. Further, the seal member 180 may be positioned proximate to the second flange 136, as shown in FIG. 5. Thereafter, the first section 124 along with the seal member 180 may be received by the second section 126. For example, the cut-out member 160 may be removed for allowing the second section 126 to receive the first section 124. Once, the second section 126 receives the first section 124, the cut-out member 160 may be coupled to the second section 126 with the help of fasteners 168 for allowing the cable raceway 120 to attain the assembled state.

In the assembled state, the second section 126 is configured to enclose a portion of the first section 124. For example, the second hollow body 150 and the second lip 156 of the second section 126 enclose a portion of the first hollow body 130 and the second flange 136 of the first section 124. In such instance, the seal member 180 is positioned between the second hollow body 150 and the first hollow body 130 and between the second lip 156 and the second flange 136 in the assembled state, as shown in FIG. 5. This allows the seal member 180 to isolate the first section 124 from the second section 126. Further, in the assembled state, the second hollow body 150 and the first hollow body 130 defines a through opening for allowing the cable raceway 120 to receive the cables 122 there-through, as shown in FIG. 2.

INDUSTRIAL APPLICABILITY

The present disclosure provides the generator assembly 100 having the cable raceway 120. The cable raceway 120 is adapted to be mounted between the power center 102 and the generator power connection box 110. During operation of the generator assembly 100, the power center 102 and the generator power connection box 110 tend to vibrate or attain some movement. For example, the operation of the prime mover 104 and the generator 106 may cause the power center 102 and the generator power connection box 110 to vibrate. Therefore, the cable raceway 120 of the present disclosure may be capable of being mounted between movable components. For the purposes of this disclosure, the generator power connection box 110 and the power center 102 may be referred to as a first movable component and a second movable component, respectively.

The first section 124 and the second section 126 may be accordingly mounted on the first movable component, i.e., the generator power connection box 110, and the second movable component, i.e., the power center 102, respectively. However, it may be evident to a person skilled in the art that, the first section 124 may be mounted on the second movable component, i.e., the power center 102, and the second section 126 may be mounted on the first movable component, i.e., the generator power connection box 110. It is to be understood that, the mounting of the first section 124 and the second section 126 may be performed when the cable raceway 120 is in the assembled state. Further for mounting, the first flange 132 of the first section 124 may be coupled to the generator power connection box 110 with the help of coupling means 140. Similarly, the first lip 152 of the second section 126 may be coupled to the generator 106 with the help of coupling means 170.

The cable raceway 120 of the present disclosure may be adapted to accommodate the vibrations or movements of the power center 102 and the generator power connection box 110. For example, the first section 124 and the second section 126 may move longitudinally and/or laterally with respect to each other for accommodating the vibrations or movements experienced by the power center 102 and the generator power connection box 110. The ability to accommodate the vibrations or movements makes the cable raceway 120 of the present disclosure a flexible cable raceway.

The seal member 180 may further facilitate in absorbing local vibrations experienced by the first section 124 and the second section 126. This may allow the cable raceway 120 to function in an intact manner. For example, the seal member 180, which may be made of elastic material, may help in absorbing the local vibrations experienced by the first section 124 and the second section 126.

The cable raceway 120 of the present disclosure provides a passage for the cables 122 to pass there-through and electrically couple the generator power connection box 110 with the power center 102. Further, the cable raceway 120 accommodates the cables 122 and contain electrical fault. Additionally, the cable raceway 120 may provide weatherproofing to the cables 122.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A cable raceway, comprising:
   a first section having a first end and a second end, the first end adapted to be coupled with a first movable component;
   a second section adapted to be coupled with a second movable component, wherein the second section is configured to enclose a portion of the first section second end; and
   a seal member placed between the first section and the second section, wherein the seal member is configured to isolate the first section and the second section.

2. The cable raceway of claim 1, wherein the first section includes a first hollow body, a first flange extending outwardly from the first end of the first hollow body, and a second flange extending outwardly from the second end of the first hollow body.

3. The cable raceway of claim 2, wherein the first hollow body is configured to have one of a circular, an oval or a polygonal elongated structure.

4. A cable raceway, comprising:
   a first section adapted to be coupled with a first movable component;
   a second section adapted to be coupled with a second movable component, wherein the second section is configured to enclose a portion of the first section, and wherein the second section includes a second hollow body, a first lip extending outwardly from a first end of the second hollow body, and a second lip extending inwardly from a second end of the second hollow body; and
   a seal member placed between the first section and the second section, wherein the seal member is configured to isolate the first section and the second section.

5. The cable raceway of claim 4, wherein the second hollow body is configured to have one of a circular, an oval or a polygonal elongated structure.

6. A cable raceway, comprising:
   a first section adapted to be coupled with a first movable component;
   a second section adapted to be coupled with a second movable component, wherein the second section is configured to enclose a portion of the first section, and wherein a second hollow body and a second lip of the second section enclose a portion of a first hollow body and a second flange of the first section; and
   a seal member placed between the first section and the second section, wherein the seal member is configured to isolate the first section and the second section.

7. The cable raceway of claim 6, wherein the second hollow body and the first hollow body defines a through opening for allowing cables to pass there-through.

8. The cable raceway of claim 1, wherein the second section includes a cut-out member adapted to be removed for allowing the second section to receive the first section.

9. The cable raceway of claim 8, wherein the cut-out member includes a body portion conforming to a second hollow body of the second section, a first brim in line with a first lip of the second section, and a second brim in line with a second lip of the second section.

10. The cable raceway of claim 9, further including fasteners for coupling the body portion of the cut-out member with the second hollow body of the second section.

11. The cable raceway of claim 1, further including coupling means for coupling the first section with the first movable component and the second section with the second movable component.

12. The cable raceway of claim 1, wherein the first section and the second section are made of a metal, a steel-carbon alloy, a polymer or a metal alloy.

13. The cable raceway of claim 1, wherein the seal member is made of an elastomeric material, or a polymer.

14. A cable raceway between a generator power connection box and a power centre, the cable raceway comprising:
- a first section adapted to be coupled with the generator power connection box;
- a second section adapted to be coupled with the power centre, wherein the second section is configured to enclose a portion of the first section; and
- a seal member placed between the first section and the second section, wherein the seal member is configured to isolate the first section and the second section.

15. The cable raceway of claim 14, wherein the first section includes a first hollow body, a first flange extending outwardly from a first end of the first hollow body, and a second flange extending outwardly from a second end of the first hollow body.

16. The cable raceway of claim 14, wherein the second section includes a second hollow body, a first lip extending outwardly from a first end of the second hollow body, and a second lip extending inwardly from a second end of the second hollow body.

17. The cable raceway of claim 14, wherein a second hollow body and a second lip of the second section enclose a portion of a first hollow body and a second flange of the first section.

18. The cable raceway of claim 14, wherein the first section and the second section are made of a metal or a metal alloy, and wherein the seal member is made of an elastomeric material.

19. A generator assembly comprising:
- a power centre;
- a generator power connection box operatively coupled to the power centre by cables; and
- a cable raceway between the power centre and the generator power connection box for allowing the cables to pass there-through, the cable raceway including
  - a first section adapted to be coupled with the generator power connection box,
  - a second section adapted to be coupled with the power centre, wherein the second section is configured to enclose a portion of the first section, and
  - a seal member placed between the first section and the second section, wherein the seal member is configured to isolate the first section and the second section.

20. The cable raceway of claim 19, wherein the first section and the second section are made of a metal or a metal alloy, and wherein the seal member is made of an elastomeric material.

\* \* \* \* \*